United States Patent [19]
Iwatani

[11] Patent Number: 5,126,650
[45] Date of Patent: Jun. 30, 1992

[54] INDICATION DEVICE FOR A VEHICLE CHARGING AND GENERATING SYSTEM

[75] Inventor: Shiro Iwatani, Himeji, Japan

[73] Assignee: Mitsubishi Denki Kabushiki Kaisha, Tokyo, Japan

[21] Appl. No.: 587,476

[22] Filed: Sep. 21, 1990

Related U.S. Application Data

[63] Continuation of Ser. No. 301,927, Jan. 26, 1989, abandoned.

[30] Foreign Application Priority Data

Feb. 24, 1988 [JP] Japan ................... 63-23338

[51] Int. Cl.$^5$ .................... H02J 7/24; H02J 3/50
[52] U.S. Cl. ................................ 322/99
[58] Field of Search ................. 322/28, 73, 99

[56] References Cited

U.S. PATENT DOCUMENTS 4,555,657 11/1985 Kato et al. .............. 322/73 X
4,775,828 10/1988 Watley et al. ............ 322/99 X

FOREIGN PATENT DOCUMENTS 210777 10/1985 Japan .

Primary Examiner—R. J. Hickey
Attorney, Agent, or Firm—Sughrue, Mion, Zinn, Macpeak and Seas

[57] ABSTRACT

An indication device for a vehicle charging and generating system capable of informing the operator of the relation between the amount of power generation available and the amount of electric load applied, thereby enabling the operator to turn off unnecessary electrical loads to prevent the overdischarging of a battery. The indication device includes an AC generator having a field coil and driven by a vehicle engine, and a storage battery connected to an electric load and to the generator. A voltage regulator detects the output voltage of the generator or the voltage of the battery and has a power transistor 305 electrically connected in series with the field coil 102 of the generator to regulate the output voltage of the generator at a prescribed level. A converter 9 operates to convert the rate of electrical conduction of the power transistor into a corresponding voltage level, and an indication meter 10 is connected to the converter to display the utilized percentage of power generating capacity of the generator.

1 Claim, 3 Drawing Sheets

INDICATION DEVICE FOR A VEHICLE CHARGING AND GENERATING SYSTEM

This is a continuation of application Ser. No. 07/301,927, filed Jan. 26, 1989, now abandoned.

BACKGROUND OF THE INVENTION

1. Field of the Invention

The present invention relates to a vehicle charging and generating system, and more specifically, to an indication device for such a charging and generating system adapted to indicate the power generating capacity of an AC generator for preventing the overdischarge of a storage battery which would occur even though the AC generator is normally operating.

2. Description of the Related Art

FIG. 2 shows a typical example of an electrical circuit of a vehicle charging and generating system. The system illustrated includes an AC generator 1 which has an armature coil 101 and a field coil 102 and which is adapted to be driven by an unillustrated engine installed on a vehicle.

A commutator 2 for performing the full-wave commutation of the AC output of the AC generator 1 has a main output terminal 201 for outputting main power, an auxiliary terminal 202 for energizing the field coil 102 and imposing a commutated output voltage of the AC generator 1 onto a voltage regulator 3 which will be described in detail later, and a ground terminal 203 connected to ground.

The voltage regulator 3 is to regulate the output voltage of the AC generator 1 at a prescribed level, and comprises a pair of voltage-dividing resistors 301, 302 connected in series with each other between the auxiliary output terminal 202 and the ground for dividing the output voltage from the auxiliary output terminal 202 of the commutator 2. A zener diode 303 is connected between the junction of the voltage-dividing resistors 301, 302 and the base of a control transistor 304 for detecting, together with the voltage-dividing resistors, the output voltage of the AC generator 1. The control transistor 304 is turned on and off depending upon conduction and non-conduction of the zener diode 303, and has its emitter connected to ground, and its collector connected to the base of a power transistor 305 and to the auxiliary output terminal 202 of the commutator 2 through a base resistor 306 which is the base resistance of the power transistor 305.

The power transistor 305 has its emitter connected to the ground and its collector connected to one end of the field coil 102. Specifically, the power transistor 305 is series connected with the field coil 102 and is turned on and off by means of the control transistor 304 so as to control the field current of the field coil 102.

A diode 307 is connected in parallel to the field coil 102 for absorbing discontinuous surges developing in the field coil 102.

The system further includes a battery 4, a key switch 5 and an indicator lamp 6 all of which are connected in series with each other between the auxiliary output terminal 202 and ground. Also, electric loads 7 and a load switch 8 are connected in series with each other but in parallel with the battery 4 the positive terminal of which is connected to the main output terminal 201 of the commutator 2.

FIG. 3 shows a maximum output current characteristic of the AC generator 1, i.e., the relationship between the output current and the rotational speed (rpm) of the generator which has a saturated maximum output current of 100 A. Also, shown in this figure is a total amount of electric load on the vehicle side with respect to the output current of the AC generator 1. The total electric load is generally set at 75% of the saturated maximum output current of the generator 1, i.e., 75 A or therearound.

Now, the operation of the above-described conventional vehicle charging and generating system will be described below. When the key switch 5 is closed for starting the engine, an initial energization current begins to flow from the battery 4 to the field coil 102 via the key switch 5 and the indication lamp 6 so that the AC generator 1 becomes ready to generate power and the indication lamp 6 is illuminated, indicating a state of non-power generation.

Subsequently, when the engine is started, the AC generator 1 begins to generate electrical power and the voltage at the auxiliary output terminal 202 of the commutator 2 rises. Simultaneous with this, the electric potential difference across the opposite ends of the indication lamp 6 decreases toward a state of equilibrium and the indication lamp 6 is put out, indicating the starting of normal power generation of the AC generator 1.

The voltage regulator 3 detects the output voltage of the auxiliary output terminal 202 of the commutator 2 by the voltage-dividing resistors 301, 302 and the zener diode 303. When the output voltage of the auxiliary output terminal 202 exceeds a prescribed level which is set by the voltage-dividing resistors 301, 302 and the zener diode 303, the zener diode 303 is made conductive so that the control transistor 304 is driven into a conductive state.

On the other hand, when the output voltage of the auxiliary output terminal 202 falls below the prescribed level, the zener diode 303 is made non-conductive so that the control transistor 304 is made into a non-conductive state.

As described above, by the conduction and non-conduction of the control transistor 304, the power transistor 305 is turned on and off to control the field current flowing through the field coil 102 whereby the output voltage of the AC generator 1 is adjusted to a predetermined level.

During operation, when a vehicle load 7 such as lights, motors and the like is connected or turned on by closing a load switch 8, the output voltage of the AC generator 1 drops. In order to compensate for such a drop of the output voltage, the conduction rate (i.e., the capacity for allowing a current to flow through) of the power transistor 305 increases so as to increase the field current.

In other words, the conduction rate of the power transistor 305 changes in such a manner as to balance with the amount of electric load 7 which has been turned on, thereby adjusting the output of the AC generator 1 in an increasing or decreasing sense. Accordingly, when the conduction rate of the power transistor 305 is 100%, the output of the AC generator 1 reaches its maximum which varies characteristically with respect to the rotational speed of the AC generator 1 in the manner as shown in FIG. 3.

In this connection, the total or full amount of the electric load 7 on the vehicle side is generally set at about 75 of the saturated maximum output of the AC generator 1. Accordingly, in the case illustrated in FIG. 3, the maximum output of the AC generator 1 is in balance with the total or full electric load at a rotational speed of 2,000 rpm, and hence the output of the AC generator 1 is adequate to the total electrical load at a rotational speed equal to or more than 2,000 rpm, but inadequate at a rotational speed therebelow.

In this situation, there is no problem if the duration of a low-speed operating mode of the engine is equal to or shorter than that of a high-speed operating mode, but for example, in cases where the low-speed operating mode continues for an extended period of time under heavy electric load, it is a matter of course that the output of the AC generator 1 will not be sufficient for such a load, and this must be compensated for by a discharge of the battery 4.

In such a case, however, despite the battery 4 being discharged, the operator of the vehicle is not made aware of this and continues to drive the vehicle because no provision is made for indicating such a situation. Finally, the battery 4 is overdischarged and exhausted, making the vehicle inoperative.

The above-described vehicle charging and generating system, which is not provided with any indicator means for indicating the relation between the amount of power generated by the generator 1 and the amount of electric load connected or turned on, has the following problem; in cases where the vehicle is operated in a low-speed operating mode with a heavy electric load for an extended period of time, the operator tends to continuously drive the vehicle without noticing that the battery 4 is being discharged. As a result, the battery 4 is finally overdischarged and exhausted so that the vehicle cannot travel any more.

SUMMARY OF THE INVENTION

In view of the above, the present invention is intended to obviate the abovementioned problems of the conventional system.

An object of the present invention is to provide an indication device for a vehicle charging and generating system which is able to inform the operator of a vehicle of the relation between the amount of power being generated by a generator and the amount of electric load applied.

Another object of the present invention is to provide an indication device for a vehicle charging and generating system which is operable to turn off unnecessary electrical loads so as to prevent the overdischarging of a battery, thereby making it possible to always keep the battery in the best condition.

To achieve the above objects, the present invention provides an indication device for a vehicle charging and generating system comprising an AC generator having a field coil and adapted to be driven by a vehicle engine to generate electric power, a storage battery connected to an electric load and to the generator so as to be charged thereby, and means for indicating the power generating capacity of the generator. The device further comprises a voltage regulator adapted to detect the output voltage of the generator or the voltage of the battery and having a power transistor electrically connected in series with the field coil of the generator so as to control a power supply to the field coil for regulating the output voltage of the generator at a prescribed level.

In one embodiment, the means for indicating the power generating capacity of the generator comprises a converter for converting the rate of electrical conduction of the power transistor into a corresponding voltage level, and an indication meter connected to receive the output of the converter for indicating the percentage of power generating capacity being generated by the generator on the basis of the converter output.

Preferably, the converter is operable to convert the conduction rate of the power transistor into a voltage in such a manner that the output voltage of the generator reaches its maximum, which corresponds to the maximum or extreme value pointed by the indication meter, when the conduction rate of the power transistor is 100%. Thus, the indication meter indicates 100% at the time when the generator provides its maximum output.

The above and other objects, features and advantages of the present invention will become more apparent from the following detailed description of a presently preferred embodiment of the invention when taken in conjunction with the accompanying drawings.

DESCRIPTION OF THE PREFERRED EMBODIMENT

Figure 1:
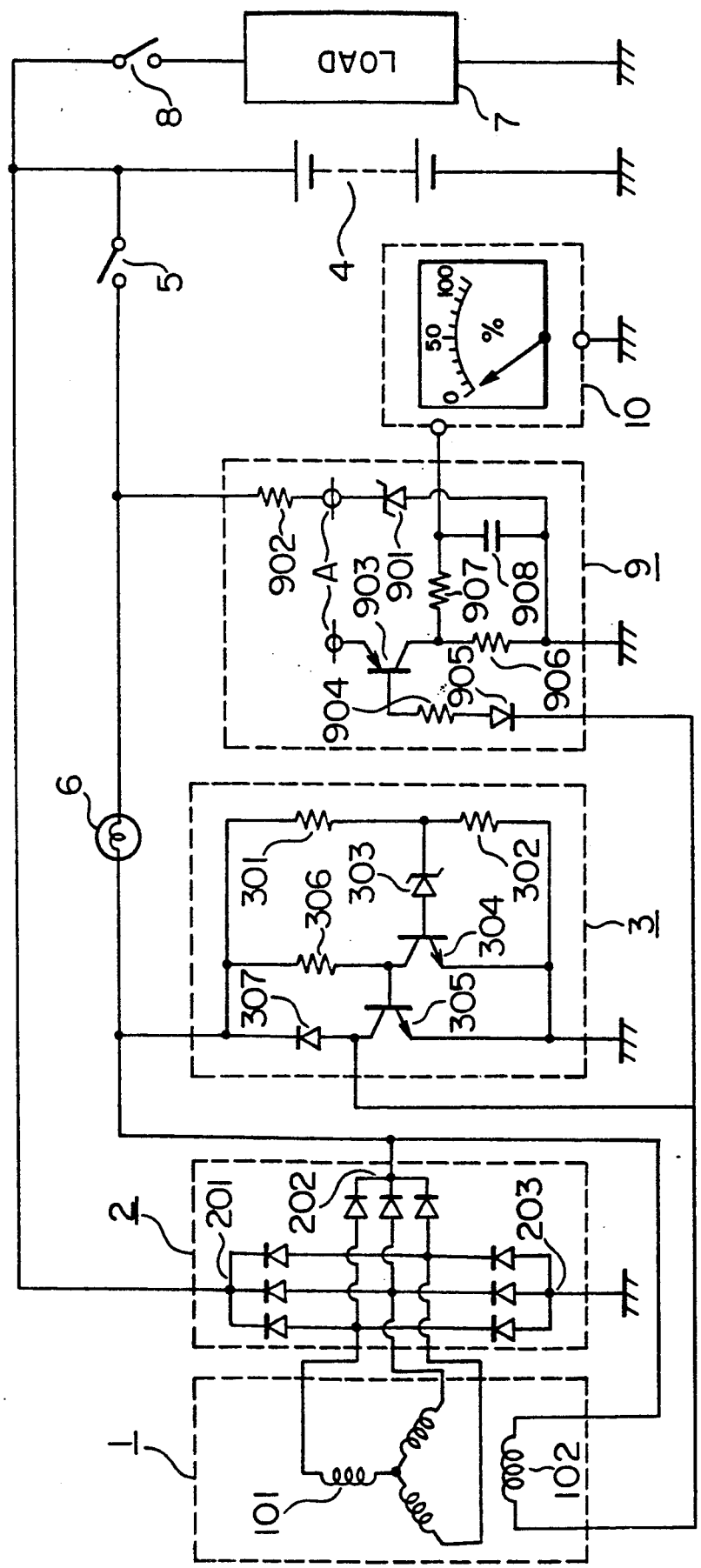
FIG. 1 is a circuit diagram showing an indication device for a vehicle charging and generating system in accordance with the present invention.

The present invention will now be described in detail with reference to an embodiment thereof as illustrated in FIG. 1 of the accompanying drawings.

Figure 2:
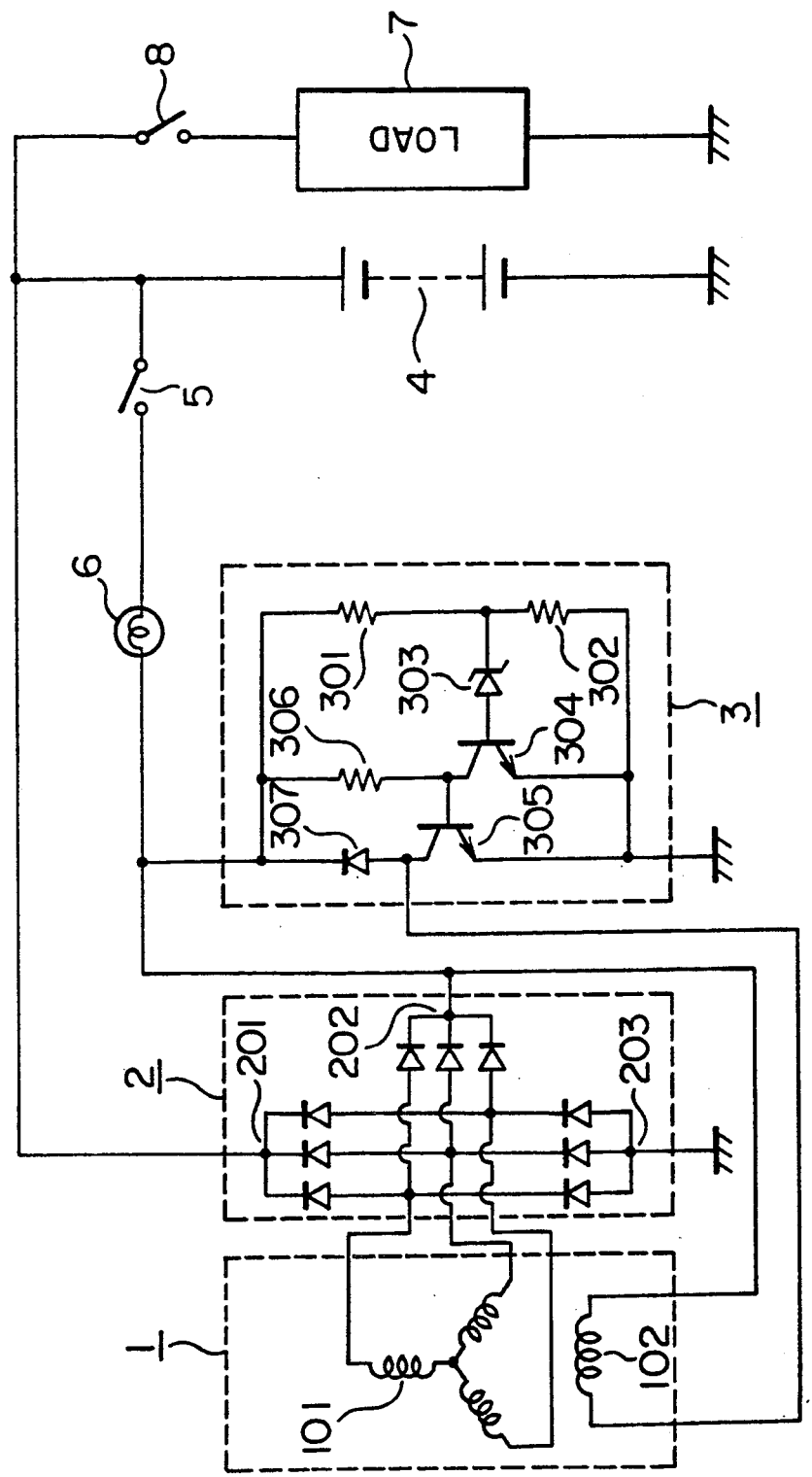
FIG. 2 is a circuit diagram of a known vehicle charging and generating system.
Figure 3:
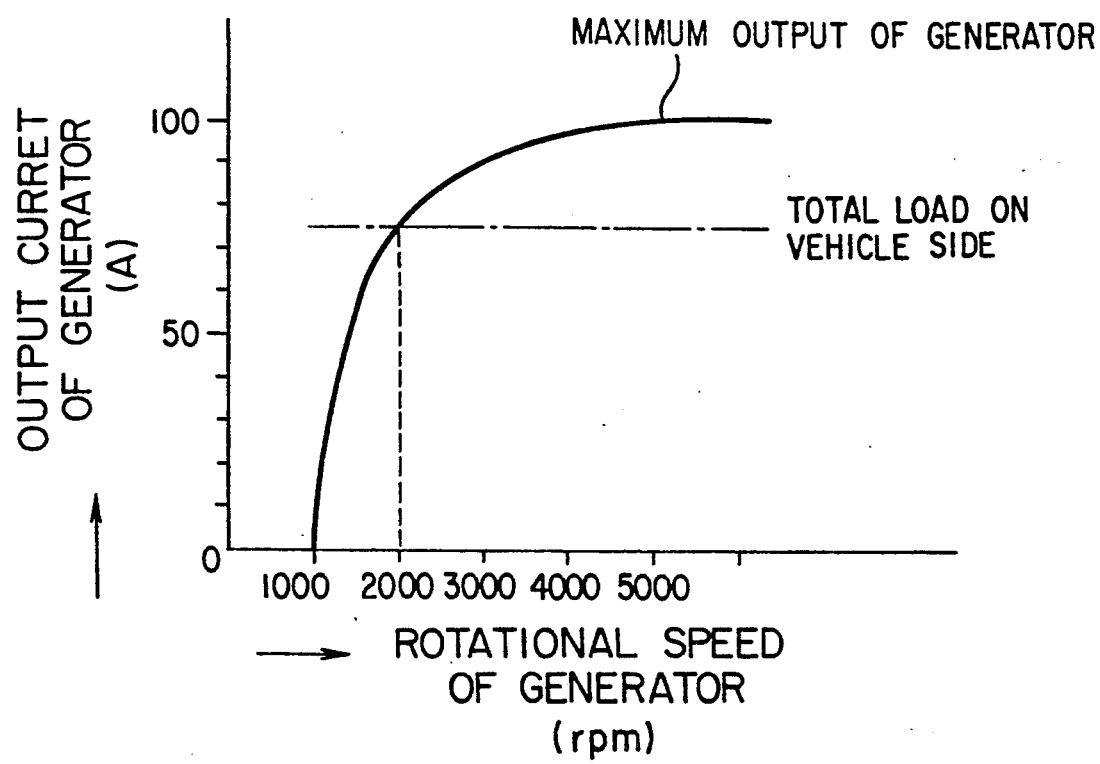
FIG. 3 is a graph showing the maximum output current characteristic of the vehicle charging and generating system of FIG. 2.

In FIG. 1, the parts or elements corresponding to those of FIG. 2 are indicated by the same reference numerals and in the following, only those portions of this embodiment which are different from the construction of FIG. 2 will be described.

As can be seen from a comparison of FIG. 1 with FIG. 2, the components of FIG. 1 indicated by reference numerals 1 through 8 are identical to those of FIG. 2 which are indicated by the same reference numerals, and the illustrated embodiment of this invention differs from the system of FIG. 1 only in those portions which are indicated by reference numerals equal to or larger than 9.

Specifically, the embodiment of FIG. 1 comprises, in addition to an AC generator 1, a commutator 2, a voltage regulator 3, a battery 4, a key switch 5, an indication lamp 6, an electric load 7 and a load switch 8, a conduction-rate to voltage converter 9 for converting the conduction rate of a power transistor 305 into a voltage level, and an indication meter 10 for indicating the output voltage of the conduction-rate to voltage converter 9 by percentage so as to show the power-generating capacity of the AC generator 1.

The conduction-rate to voltage converter 9 comprises a zener diode 901 forming a point A of a constant-voltage source and having a cathode connected through a resistor 902 to the key switch 5 and an anode connected to ground, and a transistor 903 adapted to be made conductive or non-conductive depending upon the conduction or non-conduction of the power transistor 305 of the voltage regulator 3 for detecting the conduction rate of the power transistor 305. The transistor 903 has an emitter connected to the constant-voltage source A, a base connected to an auxiliary output terminal 202 through a base resistor 904, a backflow preventing diode 905 and the field coil 102, and a collector connected to ground through a load resistor 906 and to an input terminal of the indication meter 10 through a resistor 907. A capacitor 908 is connected between the input terminal of the indication meter 10 and ground. The resistor 907 and the capacitor 908 together constitute an integration circuit.

The indication meter 10 receives the voltage output of the conduction-rate to voltage converter 9 and indicates the percentage of power generating capacity being provided by the AC generator 1.

The operation of this embodiment will now be described below. For starting the engine, the key switch 5 is turned on enabling the AC generator 1 to begin generating power and the voltage regulator 3 operates in the same manner as described before with reference to FIG. 2. Therefore, a further description of the operations of these elements will be unnecessary.

Under a certain load condition of the vehicle, the conduction rate of the power transistor 305 corresponding to the amount of electrical load at that time is converted into a voltage level by the conduction-rate to voltage converter 9 so that the indication meter 10 can accordingly indicate the percentage of power generating capacity being provided by the AC generator 1.

If an electric load 7 of, for example, 25A is connected to the battery 4 by closing a load switch 8 when the maximum output current of the AC generator 1 at a certain rotational speed is 50A, the conduction rate of the power transistor 305 corresponding to the electric load 7 is 50% which is then converted into a voltage that is supplied to the indication meter 10 whereby the meter 10 indicates 50%. This means that the portion of power generating capacity provided by the AC generator 1 at that time is half of the maximum output current, i.e. 50%, showing that the power generating capacity of the AC generator 1 is much greater than that which is required for the load 7. In other words, the AC generator 1 has enough power in reserve for the load 7.

Further, if another electrical load of 25A is connected to the battery 4 and thus the total sum of both these electric loads becomes 50A, the conduction rate of the power transistor 305 increases to 100% and the indication meter 10 also indicates 100%, showing that the AC generator 1 is operating to generate its maximum output power. That is, if any further electrical load is connected to the battery 4, the AC generator 1 can not accommodate such a load, thus resulting in a discharge of the battery 4. In other words, if the indication meter 10 always indicates a value less than 100%, it is determined that the AC generator 1 is operating with sufficient output power reserved for the load and that the battery 4 is sufficiently charged and operates in the best condition.

As described in the foregoing, the indication device of the present invention is constructed such that it detects the conduction rate of the power transistor of the voltage regulator and indicates the detected conduction rate by percentage by means of an indication meter. With this construction, it can not only inform the vehicle operator of the ratio of the total amount of connected or turned-on electrical load to the maximum capacity of the AC generator, but also warn the operator so that he or she can turn off any unnecessary electrical loads if the indication meter indicates 100% or thereabout. Consequently, it is possible to avoid the vehicle becoming abruptly unable to run due to an overdischarge of the battery, and the battery can be maintained in the best operating state at all times.

What is claimed is:

1. An indication device for a vehicle charging and generating system comprising:

an AC generator (1) having a field coil (102) and adapted to be driven by a vehicle engine to generate electric power;

a storage battery (4) connected to an electric load (7) and to said generator so as to be charged thereby;

a voltage regulator (3) for detecting the output voltage of said generator or the voltage of said battery and having a power transistor (305) electrically connected in series with said field coil of said generator so as to control a power supply to said field coil for regulating the output voltage of said generator at a prescribed level as a function of the value of said electric load, and means for indicating a power output level of the generator as a percentage of the maximum available generator output power at a given rotational speed of the generator to a vehicle operator to alert the operator to a battery discharge condition, said indicating means comprising a converter (9) for converting the rate of electrical conduction of said power transistor into a corresponding analog voltage level output, and an analog indication meter (10) connected to receive the output of said converter for indicating the percentage of available power generating capacity of said generator being utilized, wherein the converter is operable to convert the conduction rate of said power transistor into an analog voltage level in such a manner that the output voltage of said generator reaches its maximum corresponding to the maximum or extreme value indicated by a pointer of said indication meter when the conduction rate of said power transistor is 100%.

* * * * *